(12) United States Patent
Kwak et al.

(10) Patent No.: US 8,654,718 B2
(45) Date of Patent: Feb. 18, 2014

(54) METHOD OF TRANSMITTING A WIDEBAND FRAME

(75) Inventors: Jin Sam Kwak, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 12/677,439

(22) PCT Filed: Sep. 22, 2008

(86) PCT No.: PCT/KR2008/005623
§ 371 (c)(1),
(2), (4) Date: Mar. 10, 2010

(87) PCT Pub. No.: WO2009/038429
PCT Pub. Date: Mar. 26, 2009

(65) Prior Publication Data
US 2010/0329384 A1   Dec. 30, 2010

Related U.S. Application Data

(60) Provisional application No. 61/022,824, filed on Jan. 23, 2008.

(30) Foreign Application Priority Data

Sep. 21, 2007   (KR) ........................ 10-2007-0096625

(51) Int. Cl.
*H04W 72/00* (2009.01)

(52) U.S. Cl.
USPC .................... 370/329; 455/452.1; 455/454

(58) Field of Classification Search
None
See application file for complete search history.

(56) References Cited

U.S. PATENT DOCUMENTS

| 7,986,613 | B2 | 7/2011 | Lomnitz |
| 2005/0117539 | A1 | 6/2005 | Song et al. |
| 2006/0229090 | A1* | 10/2006 | LaDue .......................... 455/507 |
| 2007/0189197 | A1 | 8/2007 | Kwon et al. |

(Continued)

FOREIGN PATENT DOCUMENTS

| EP | 1 715 705 A2 | 10/2006 |
| JP | 2000-13310 A | 1/2000 |
| WO | WO-2005/122425 A2 | 12/2005 |

*Primary Examiner* — Jianye Wu
(74) *Attorney, Agent, or Firm* — Birch, Stewart, Kolasch & Birch, LLP

(57) ABSTRACT

A method of transmitting a wideband frame for a wideband system having backward compatibility with a narrowband system includes configuring a wideband carrier by using a set of base carriers, wherein a bandwidth of the base carriers corresponds to a bandwidth of the narrowband system and any one of center frequencies of the base carriers is the same as a center frequency of the narrowband system, and allocating all or some of guard subcarriers between the two adjacent base carriers to a traffic channel when a center frequency spacing between two adjacent base carriers is an integer multiple of a subcarrier spacing. Accordingly, the method can be used to support backward compatibility with the narrowband system. Further, the method can be equally used when the narrowband system co-exists with the wideband system in a guard band defined in a narrowband of a new system.

6 Claims, 6 Drawing Sheets

(56) References Cited

U.S. PATENT DOCUMENTS

| | | |
|---|---|---|
| 2007/0211658 A1 | 9/2007 | Gorokhov et al. |
| 2007/0293229 A1 | 12/2007 | Khan |
| 2008/0031191 A1 | 2/2008 | Kashima et al. |
| 2008/0159758 A1* | 7/2008 | Shpantzer et al. ............ 398/214 |
| 2008/0198911 A1 | 8/2008 | Hui et al. |
| 2009/0116434 A1 | 5/2009 | Lohr et al. |
| 2010/0009691 A1 | 1/2010 | Choi et al. |
| 2010/0041445 A1 | 2/2010 | Qi et al. |
| 2010/0103896 A1 | 4/2010 | Cho et al. |
| 2011/0065468 A1 | 3/2011 | Parkvall et al. |

* cited by examiner

METHOD OF TRANSMITTING A WIDEBAND FRAME

TECHNICAL FIELD

The present invention relates to wireless communications, and more particularly, to a method of transmitting a wideband frame so that a narrowband system and a wideband system co-exist in a system in which a narrowband and a wideband are defined.

BACKGROUND ART

A wireless communication system is widely used to provide various types of communication services. For example, the wireless communication system provides voice and/or data services. The wireless communication system can use a frequency division duplex (FDD) scheme or a time division duplex (TDD) scheme. In the FDD scheme, uplink transmission and downlink transmission are achieved at the same time point while occupying different frequency bands. In the TDD scheme, uplink transmission and downlink transmission are achieved at different time points while occupying the same frequency band.

In order to effectively use limited radio resources in the wireless communication system, there are proposed methods and utilization for further effective transmission and reception in time, space, and frequency domains. Orthogonal frequency division multiplexing (OFDM) uses a plurality of orthogonal subcarriers. Further, the OFDM uses orthogonality between inverse fast Fourier transform (IFFT) and fast Fourier transform (FFT). A transmitter transmits data by performing the IFFT. A receiver restores original data by performing the FFT on a received signal. The transmitter uses the IFFT to combine the plurality of subcarriers. The receiver uses the FFT to split the plurality of subcarriers. According to the OFDM, complexity of the receiver can be reduced in a frequency selective fading environment of a wideband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

The institute of electrical and electronics engineers (IEEE) 802.16 standard group was established in 1999 for broadband wireless access (BWA) standardization. The 'WirelessMAN-OFDMA' standard has recently been defined to use the OFDMA. The IEEE 802.16-2001 was approved in 2001, and is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Recently, standardization on the IEEE 802.16m is in progress as a new technical standard based on the IEEE 802.16e. The IEEE 802.16m, which is a newly developed technical standard, has to be designed to support the previously designed IEEE 802.16e. That is, the newly designed system (i.e., IEEE 802.16m) has to be designed to effectively incorporate an operation of a legacy system (i.e., IEEE 802.16e). This is called backward compatibility.

Accordingly, there is a need to propose a frame structure of a new system supporting backward compatibility with a legacy system.

DISCLOSURE OF INVENTION

Technical Problem

The present invention provides a method of transmitting a wideband frame.

Technical Solution

According to an aspect of the present invention, there is provided a method of transmitting a wideband frame for a wideband system having backward compatibility with a narrowband system. The method includes: configuring a wideband carrier by using a set of base carriers, wherein a bandwidth of the base carriers corresponds to a bandwidth of the narrowband system and any one of center frequencies of the base carriers is the same as a center frequency of the narrowband system, and allocating all or some of guard subcarriers between the two adjacent base carriers to a traffic channel when a center frequency spacing between two adjacent base carriers is an integer multiple of a subcarrier spacing.

According to another aspect of the present invention, there is provided a method of transmitting data in a wideband system including a frequency band of a narrowband system. The method includes: dividing a frequency band of the wideband system into a plurality of base carriers, wherein each of the plurality of base carriers includes a guard band, and at least one bandwidth of the plurality of base carriers coincides with a bandwidth of the narrowband system, allocating one of the plurality of base carriers to a narrowband base carrier for the narrowband system and allocating the remaining base carriers to a wideband base carrier for the wideband system, wherein a guard band between the narrowband base carrier and its adjacent wideband base carrier is allocated to a traffic channel, and transmitting user data or control information through the traffic channel.

Advantageous Effects

According to the present invention, a subcarrier allocated to a guard band for a narrowband system can be utilized as a traffic channel in a wideband system supporting backward compatibility with the narrowband system. Therefore, limited radio resources can be effectively used.

MODE FOR THE INVENTION

Figure 1:
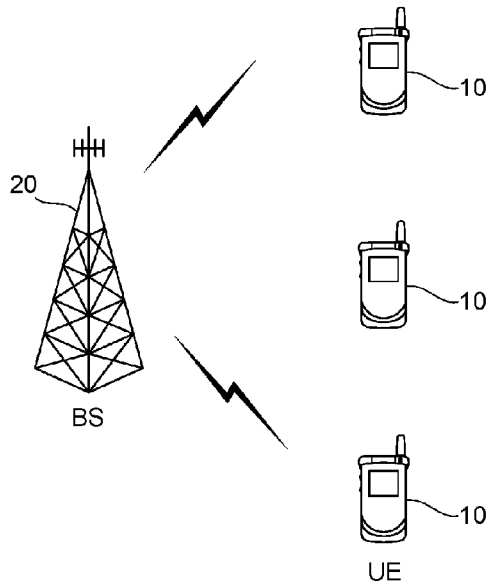
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink denotes a communication link from the BS 20 to the UE 10, and an uplink denotes a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

There is no restriction on multiple access schemes used in the wireless communication system. Various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

Figure 2:
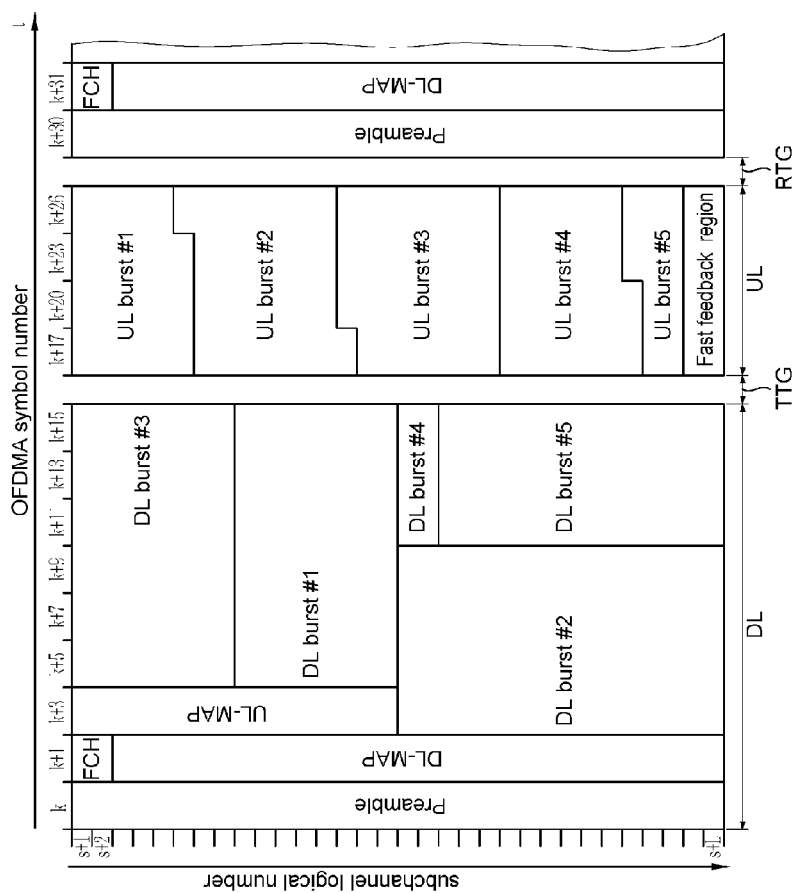
FIG. 2 shows an example of a frame structure.

FIG. 2 shows an example of a frame structure. A frame is a data sequence used according to a physical specification in a fixed time duration. This may be found in section 8.4.4.2 of "Part 16: Air Interface for Fixed Broadband Wireless Access Systems" in the institute of electrical and electronics engineers (IEEE) standard 802.16-2004 (hereinafter, Document 1).

Referring to FIG. 2, the frame includes a downlink (DL) frame and an uplink (UL) frame. In a time division duplex (TDD) scheme, UL and DL transmissions are achieved at different time points but share the same frequency band. The DL frame is temporally prior to the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a downlink burst and a subsequent uplink burst. A receive/transmit transition gap (RTG) is a gap between an uplink burst and a subsequent downlink burst.

A preamble is used between a BS and a UE for initial synchronization, cell search, and frequency-offset and channel estimation. An FCH includes information on a length of a DL-MAP message and a coding scheme of the DL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel and is periodically transmitted by the BS by using a UCD message.

Hereinafter, a slot is a minimum unit of possible data allocation, and is defined with a time and a subchannel. The number of subchannels depends on a fast Fourier transform (FFT) size and time-frequency mapping. Each subchannel includes a plurality of subcarriers. The number of subcarriers included in each subchannel differs according to a permutation rule. Permutation denotes mapping from a logical subchannel to a physical subcarrier. In full usage of subchannels (FUSC), each subchannel includes 48 subcarriers. In partial usage of subchannels (PUSC), each subchannel includes 24 or 16 subcarriers. A segment denotes at least one subchannel set.

In order for data to be mapped to physical subcarriers in a physical layer, two steps are generally performed on the data. In a first step, the data is mapped to at least one data slot on at least one logical subchannel. In a second step, each logical subchannel is mapped to a physical subcarrier. This is called permutation. Examples of the permutation rule employed in the Document 1 above (i.e., the IEEE 802.16-2004 standard) include FUSC, PUSC, optional-FUSC (O-FUSC), optional-PUSC (O-PUSC), adaptive modulation and coding (AMC), etc. A set of OFDM symbols using the same permutation rule is referred to as a permutation zone. One frame includes at least one permutation zone.

The FUSC and the O-FUSC are used only in downlink transmission. The FUSC consists of one segment including all subchannel groups. Each subchannel is mapped to a physical subcarrier distributed over the entire physical channel. This mapping varies for each OFDM symbol. A slot consists of one subchannel on one OFDM symbol. The O-FUSC uses a pilot allocation scheme different from that used in the FUSC.

The PUSC is used both in downlink transmission and uplink transmission. In downlink, each physical channel is divided into clusters, each of which includes 14 contiguous subcarriers on two OFDM symbols. The physical channel is mapped to six groups. In each group, pilots are allocated in fixed positions to each cluster. In uplink, subcarriers are divided into tiles, each of which includes four contiguous physical subcarriers on three OFDM symbols. The subchannel includes six tiles. Pilots are allocated to the corners of each tile. The O-PUSC is used only in uplink transmission. Each tile includes three contiguous physical subcarriers on three OFDM symbols. Pilots are allocated to the center of each tile.

Figure 3:
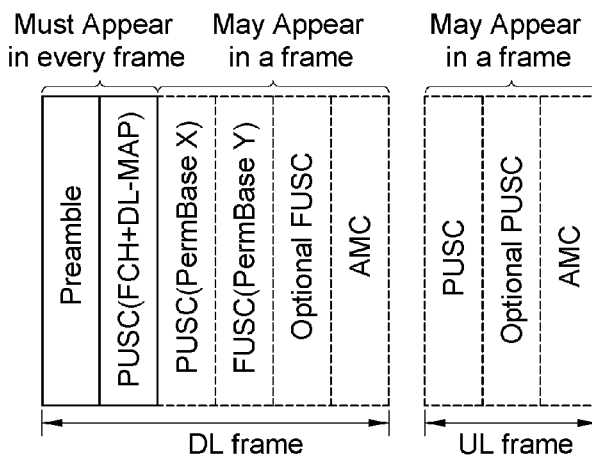
FIG. 3 shows an example of a frame including a plurality of permutations.

FIG. 3 shows an example of a frame including a plurality of permutations. The frame may be a physical frame.

Referring to FIG. 3, in a DL frame, a preamble, an FCH, and a DL-MAP must appear in every frame. A PUSC permutation is applied to the FCH and the DL-MAP. A PUSC permutation, an FUSC permutation, an optional FUSC permutation, and an AMC permutation may appear in the DL frame. The permutations appeared in the DL frame can be specified in the DL-MAP. A PUSC permutation, an optional PUSC, and an AMC permutation may appear in a UL frame. The permutations appeared in the UL frame can be specified in a UL-MAP.

Data or control information in frames can be accurately obtained by using the preamble, the FCH, the DL-MAP, or the like included in each frame.

A BS can use a part of frequency band by dividing the whole frequency band. For example, neighboring BSs may use different frequency bands to avoid inter-BS interference. Alternatively, one BS may divide one cell into a plurality of sectors so that different frequency bands are used by the respective sectors. As such, frames can be transmitted for each divided frequency band.

Figure 4:
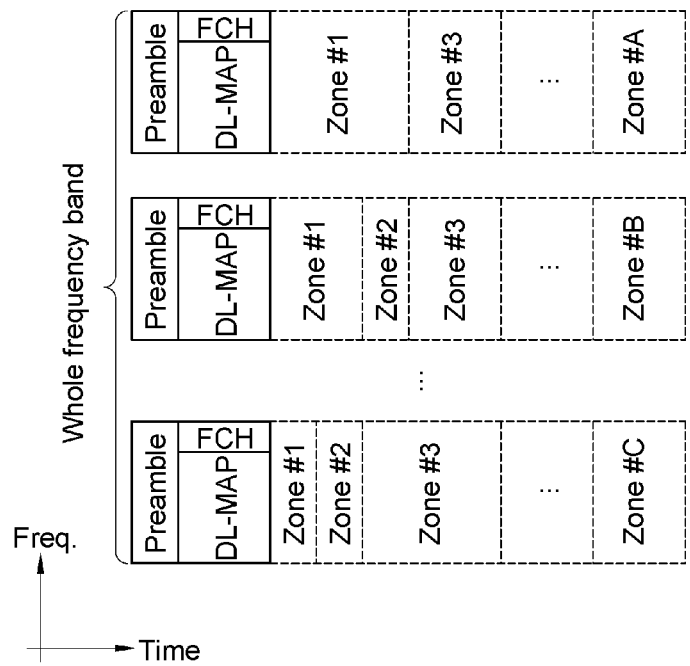
FIG. 4 shows an example of a frame generated in every frequency band by dividing a whole frequency band.

FIG. 4 shows an example of a frame generated in every frequency band by dividing a whole frequency band. This is a case where frames having the same format are generated and transmitted in respective frequency bands.

Referring to FIG. 4, the whole frequency band can be divided into a plurality of frequency bands so that frames can be generated and transmitted in the respective frequency bands. In this case, the respective frequency bands may be used by different BSs. Alternatively, the respective frequency bands may be used by one BS in difference sectors. The respective frequency bands may be either contiguous frequency bands or scattered frequency bands on the whole frequency band. In each frequency band, a frame can be generated and transmitted using one system. That is, data can be transmitted through a frame having the same format in each frequency band.

The whole frequency band can be divided into a plurality of frequency bands so that frames with different formats are generated and transmitted in the respective frequency bands. The frames can be generated and transmitted using other systems in the respective frequency bands. When the frames are generated and transmitted using other systems in an arbitrary frequency band, there is a need to process signals repetitively or independently. As a result, there may be a restriction on the effective use of limited radio resources. In particular, a head portion of a control signal causes a significant overhead since the head portion of the control signal is repeated in each frame, thereby decreasing a data transfer amount of the system. In addition, when the frames of other systems are used, it is difficult to configure a channel having a structure flexible in various bandwidths.

Accordingly, when transmitting data, a frame length needs to be shorter than that of a TDD-based frame. A frequency division duplex (FDD) structure may have a shorter frame length than the TDD structure. For example, when the TDD-based frame has a length of 5 milliseconds (msec), a frame (i.e., region) for supporting FDD can have a length of 1 to 3 msec. Conditions to be considered in the designing of a new frame are as follows.

(1) A distributed or localized subcarrier allocation scheme is supported within a single frame.

(2) A subcarrier subchannel allocation scheme is easily used in a structure of the frame.

(3) Ranging or control signal transport channels using localized subband allocation within an uplink frame is supported to provide an improved coverage.

(4) An overhead of MAP information on resources allocated to each UE is minimized.

(5) Unlike the conventional TDD-based control information transmission scheme, hierarchical control information capable of supporting a transmission time interval (TTI) can be transmitted.

(6) A conventional system can be supported within a conventional frequency band.

(7) The conventional system co-exists with a new system in a single frequency band.

(8) Performance deterioration does not occur in a UE of the conventional system coexisting with the new system.

(9) The new system can independently operate, and generation of additional control signals is minimized.

(10) A channel structure can be supported in a flexible manner within a contiguous or scattered frequency band.

(11) The control signal can be easily supported by a single-mode UE supporting one system and a dual-mode UE supporting two or more systems.

The frame is designed to satisfy all or some of the aforementioned conditions.

Figure 5:
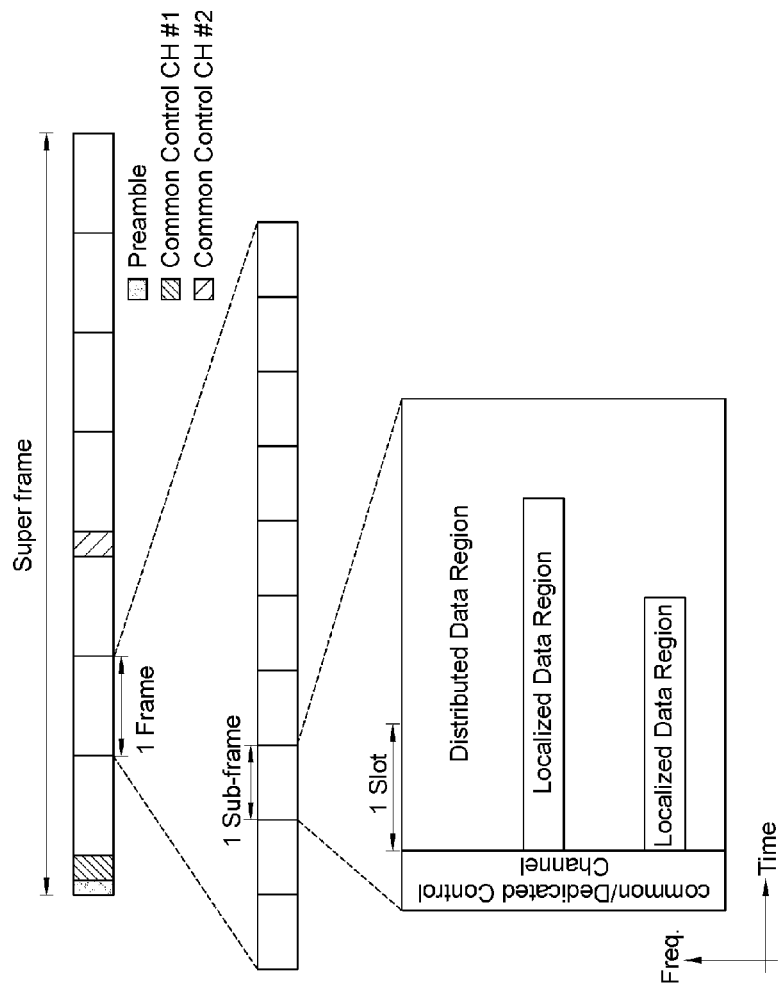
FIG. 5 shows a subframe structure according to an embodiment of the present invention.

FIG. 5 shows a subframe structure according to an embodiment of the present invention. The subframe is a downlink frame that can indicate frequency-time physical resource allocation.

Referring to FIG. 5, a physical frame includes a control channel region and/or a data region. The control channel region may be a common control channel and/or a dedicate control channel. The common control channel is used to transmit control information that can be commonly utilized by UEs. The control information may be system configuration information which is common within a whole or part of a subframe, a frame, or a super-frame. (Herein, the super-frame may consist of one or more frames, and the frame may consist of one or more subframes. Generally, a three hierarchical frame configuration can be optionally configured in one or more layers. The dedicated control channel is utilized to transmit control information required for a specific UE. A BS can optionally utilize the dedicated control channel to transmit system configuration information or resource allocation information for a specific UE. The data region includes a distributed data region and/or a localized data region. The distributed data region and the localized data region can be distinguished in the frequency domain. That is, the distributed data region and the localized data region use a frequency division method. The distributed data region and the localized data region may use different permutation rules. The distributed data region and/or the localized data region may be included in one slot unit while occupying different frequency bands. That is, a distributed subcarrier allocation scheme and/or a localized subcarrier allocation scheme can be used within one slot constituting the subframe. In the distributed subcarrier allocation scheme, a plurality of subcarriers constituting one piece of data are mapped in the data region in a distributed manner. In the localized subcarrier allocation scheme, a plurality of subcarriers constituting one piece of data are mapped in a consecutive manner. Since the distributed subcarrier allocation scheme and the localized subcarrier allocation scheme are supported in the frequency domain within one slot, efficiency of frequency resources can be increased.

A plurality of frames can constitute one super-frame. It is assumed herein that one super-frame includes 7 frames. One frame can be transmitted in one transmission time interval (TTI) which is a time for concurrently transmitting data. $1^{st}$ to $7^{th}$ frames are transmitted in a temporal order. The BS can transmit the super-frame by including a preamble or a first common control channel (i.e., common control CH #1) in the $1^{st}$ frame of the super-frame. Further, the BS can transmit the super-frame by including a second common control channel (i.e., common control CH #2) in the $4^{th}$ frame of the super-frame. The remaining frames can be transmitted by including the dedicated control channel. The BS can report information on the 7 frames included in the super-frame by using the common control CH #1. The BS can report information on the remaining frames transmitted later by using the common control CH #2.

As described above, the preamble is included only in the 1$^{st}$ frame of the super-frame, and control information on radio resources allocated to the UE is not reported in every frame but reported through hierarchical mapping by being included only in some frames. Accordingly, an overhead caused by the control signal can be reduced. In addition, a multi-user diversity gain and a frequency diversity gain can be effectively obtained by separating the data region according to the frequency division method during a short frame duration.

Figure 6:
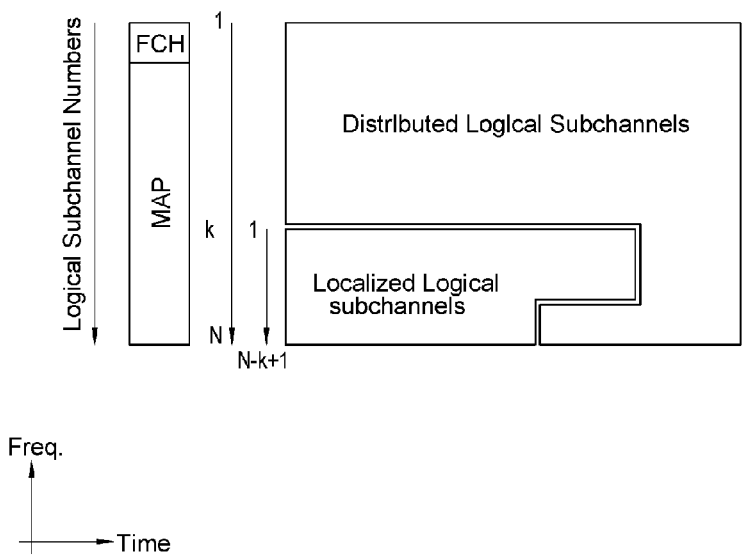
FIG. 6 shows a logical frame for a physical frame of FIG. 5.

FIG. 6 shows a logical frame for the physical frame of FIG. 5. The logical frame may be a logical downlink frame. The logical frame can be generated by performing logical mapping from the physical frame. The physical frame can be generated by performing physical mapping from the logical frame. The physical frame and the logical frame correspond to each other. A BS and a UE may know in advance information on physical mapping and logical mapping.

Referring to FIG. 6, the logical frame can include a MAP, an FCH, and a logical subchannel region. A control channel region of the physical frame is logical-mapped to the MAP and the FCH. The MAP and the FCH can be temporally prior to the logical subchannel region. A distributed data region of the physical frame is mapped to a distributed logical subchannel region. A localized data region of the physical frame is mapped to a localized logical subchannel region.

The logical frame can determine logical subchannel numbers in the frequency domain. The logical subchannel number can be a subchannel index to be informed to the UE. The logical subchannel number for the distributed logical subchannel region and the logical subchannel number for the localized logical subchannel may be numbers which are numbered starting from the same starting point or different starting points. For example, if it is assumed that N logical subchannels are present in the frequency domain, the distributed logical subchannel number can be set to a number in the range of 1 to N belonging to the distributed logical subchannel region. The localized logical subchannel number can be set to a number in the range of k to N ($1 \leq k \leq N$) belonging to the localized logical subchannel region. Alternatively, the localized logical subchannel number can be set to a number in the range of 1 to N−k+1 by numbering a new number starting from a first subchannel of the localized logical subchannel region.

When the BS reports the logical subchannel number to the UE, the UE can find a resource region allocated to the UE so as to transmit or receive data by using the logical subchannel number. When a frequency resource region allocated to the UE is consecutively allocated to be used during a specific time period (e.g., single/multiple frame numbers), the BS can report only the logical subchannel number to the UE. That is, the BS can represent an indicator for a downlink burst (or uplink burst) allocated to the UE only with the logical subchannel number. In comparison with a 2-dimensional indicator indicating the resource region allocated to the UE with the frequency domain and the time domain, the use of a 1-dimensional indicator indicating the resource region only with the logical subchannel number can reduce an overhead caused by transmission of resource allocation information.

Optionally, one frame can be one distributed logical subchannel region or one localized logical subchannel region of the whole frequency band, or the whole frequency band can be segmented within one frame along a time or frequency domain to constitute the distributed or localized logical subchannel. That is, a subchannel configuration method considered in a legacy system can be directly used within one frame. The legacy system may be an IEEE 802.16e system or a WiMAX system. However, the present invention is not limited thereto, and thus the legacy system may be any conventional system. The proposed subchannel configuration method may be used alone or in combination with the subchannel configuration method of the legacy system. Since the frame configuration method of the legacy system and the proposed frame configuration method can be combined to be used, the frame can be configured in a flexible manner.

Figure 7:
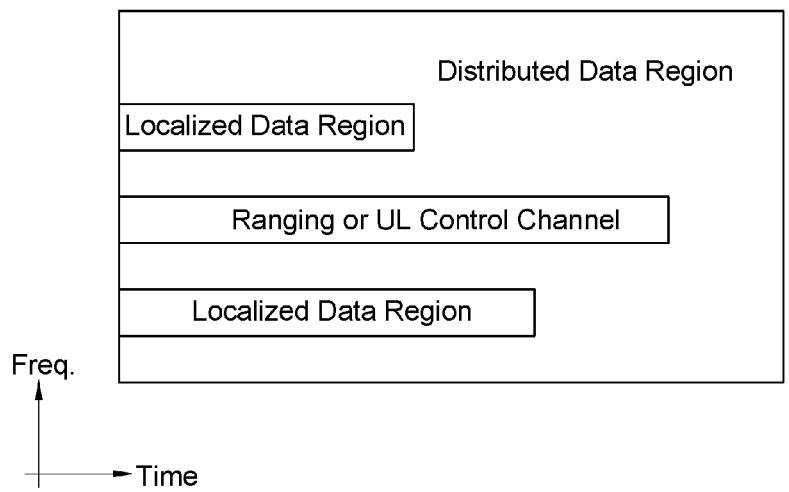
FIG. 7 shows a frame structure according to another embodiment of the present invention.

FIG. 7 shows a frame structure according to another embodiment of the present invention. The frame is an uplink frame that can indicate frequency-time physical resource allocation.

Referring to FIG. 7, a physical frame includes a data region and/or a ranging or UL control channel region. The data region includes a distributed data region and a localized data region. The ranging or UL control channel region, the distributed data region, and the localized data region are separated in a frequency domain. That is, the ranging or UL control channel region, the distributed data region, and the localized data region use a frequency division method. The respective regions can use different permutation rules. In addition, some subchannels corresponding to the distributed or localized data region can be allocated to the ranging or UL control channel.

Figure 8:
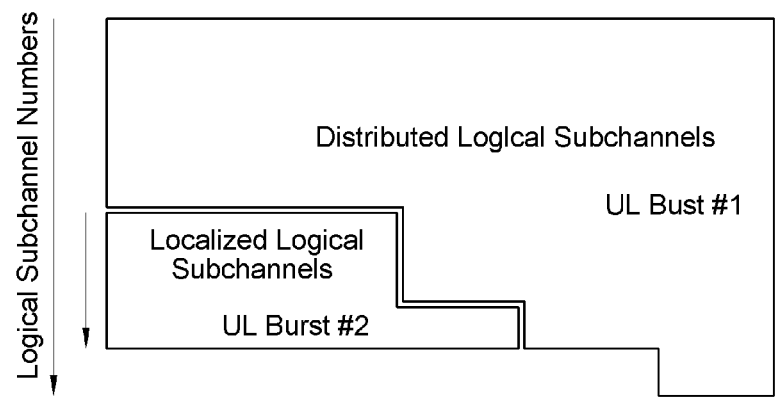
FIG. 8 shows a logical frame for a physical frame of FIG. 7.

FIG. 8 shows a logical frame for the physical frame of FIG. 7. The logical frame may be an uplink frame. The logical frame is constituted by performing logical mapping from the physical frame.

Referring to FIG. 8, the logical frame includes an uplink or downlink burst. A distributed data region of the physical frame is mapped to a distributed logical subchannel region. A localized data region of the physical frame is mapped to a localized logical subchannel region.

A ranging or UL control channel can be influenced by a configuration method of the UL control channel in a legacy system. A pre-assigned frequency domain needs to be spanned and transmitted during a plurality of OFDM symbol durations. Therefore, in a method of allocating resources within a frame, the distributed logical subchannel region and the localized logical subchannel region can be configured for a frequency-time resource region except for the ranging or UL control channel region. In the logical frame, the logical subchannel numbers can be determined as described in FIG. 6 above. A BS can transmit information regarding the ranging or UL control channel region through a common control channel of a downlink frame. If the common control channel is included in some of frames included in a super-frame, the configured logical uplink frame may not include information regarding the ranging or UL control channel region.

The aforementioned frame structure is for exemplary purposes only, and thus the present invention is not limited thereto. In the physical frame, locations and sizes of the distributed data region, the localized data region, and the control channel are not fixed but are variable within subframes. In the logical frame, locations and sizes of the distributed logical subchannel and the localized logical subchannel are not fixed but are variable within subframes. If the frame of FIG. 5 is a downlink frame and the frame of FIG. 7 is an uplink frame, the uplink frame and the downlink frame can use the FDD scheme.

Hereinafter, a frame of a wideband system supporting a narrowband system will be described. The narrowband system denotes a system using a narrower band than the wideband system. The wideband system denotes a system using a wider band than the narrowband system. A new system generally supports backward compatibility with a legacy system, and uses a bandwidth greater than that of the legacy system. That is, the legacy system may be the narrowband system, and the new system may be the wideband system. The wideband system may include a frequency band of the narrowband system so as to have backward compatibility with the narrowband system.

Figure 9:
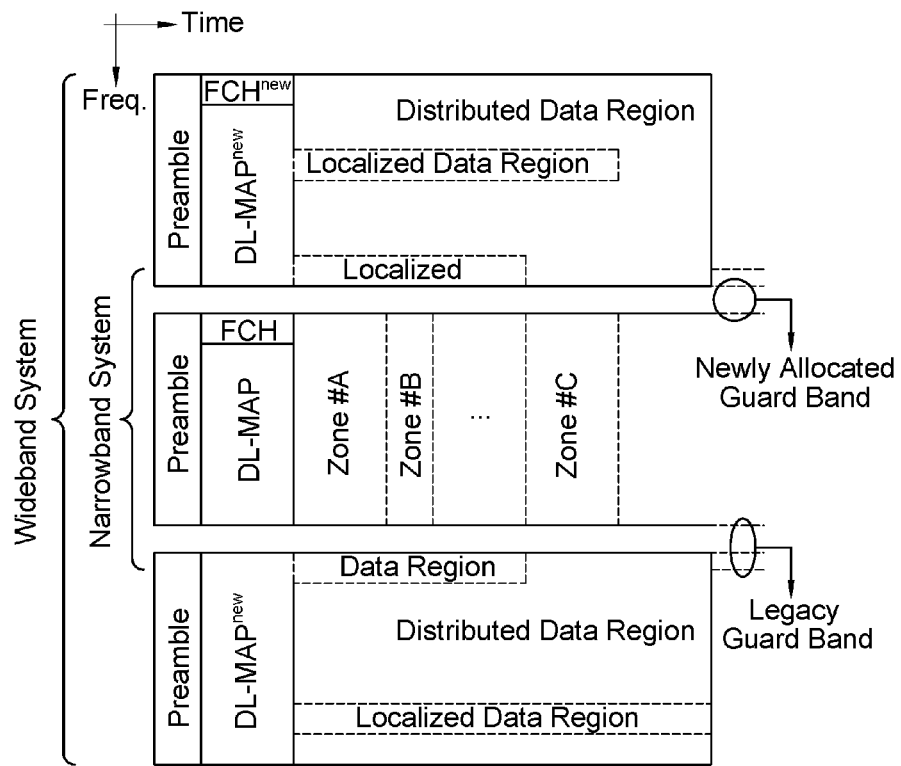
FIG. 9 shows a wideband frame of a wideband system supporting a narrowband system according to an embodiment of the present invention.

FIG. 9 shows a wideband frame of a wideband system supporting a narrowband system according to an embodiment of the present invention.

Referring to FIG. 9, it is assumed that the wideband system includes a frequency band of the narrowband system. The wideband system can support backward compatibility with the narrowband system. The narrowband system may be an IEEE 802.16e-based legacy system. The wideband system may be a new system (e.g., IEEE 802.16m) supporting the legacy system. The wideband frame denotes a frame of the wideband system supporting backward compatibility with the narrowband system.

The frequency band of the narrowband system is included in a frequency band of the wideband system. The frequency band of the wideband system is referred to as a wideband carrier. The wideband carrier is a set of a plurality of base carriers. The plurality of base carriers may have the same bandwidth or may have different bandwidths. For example, any one of the base carriers may be an integer multiple of a bandwidth of another base carrier. The wideband carrier can be divided into a plurality of base carriers. The frequency band of the wideband system can be divided into a plurality of base carriers.

The frequency band of the narrowband system can occupy an arbitrary frequency band within the frequency band of the wideband system. The bandwidth of the base carrier may correspond to the bandwidth of the narrowband system. The frequency band of the narrowband system may occupy any one of the plurality of base carriers. A center frequency of the narrowband system may coincide with a center frequency of any one of the base carriers. Data of the narrowband system can be carried on a base carrier allocated to the frequency band of the narrowband system, and data of the wideband system can be carried on the remaining base carriers. The data of the narrowband system and the data of the wideband system can be both carried on a base carrier allocated to the frequency band of the narrowband system.

A guard band can be allocated between the base carriers. The guard band includes at least one guard subcarrier. The guard band is reserved to avoid interference between the base carriers. The guard band between the base carriers allocated to transmit data of the wideband system can be used as a traffic channel. The traffic channel denotes a channel for transmitting user data or control information. A base carrier allocated to the frequency band of the narrowband system and a guard subcarrier included in the guard band between adjacent base carriers can also be allocated to the traffic channel, but at least one guard subcarrier is reserved instead of being allocated to the traffic channel. This is because the wideband system supporting backward compatibility with the narrowband system must have a minimum effect on performance of the narrowband system. The wideband system and the narrowband system may use different permutation rules, which may cause generation of interference. Therefore, the guard band is necessary between the base carrier of the narrowband system and the base carrier of the wideband system.

The wideband system can operate using a frame of the narrowband system by utilizing a mode indicator transmitted through control information. If the narrowband system is not used, the wideband system can operate using a frame supporting the wideband system. However, when the wideband system is configured to include a band allocated to the frequency band of the narrowband system, a narrowband mode and a wideband mode need to be used together. The narrowband mode may support only the narrowband system. The wideband mode may support both the narrowband system and the wideband system. When a UE uses the frequency band of the narrowband system, the UE must be able to operate in the narrowband mode without deterioration of performance, and must be able to operate in the wideband mode in other frequency bands. If the UE supports only the narrowband mode, the UE can obtain information on an available frequency band by performing a searching process on a predetermined frequency allocation region, and thus can transmit and receive data by using the frequency band. If the UE supports the wideband mode, the UE can search for a frequency band allocated to a UE of the wideband system.

In a case where the narrowband mode and the wideband mode use difference bandwidths and the both frequency bands can be used together, a UE supporting the wideband mode must have an ability to search for the frequency band allocated to the narrowband system. When there is no ability to search for the frequency band of the narrowband system, mutual interference with the narrowband system may occur in a frequency band allocated for the wideband mode, which may cause difficulty in data communication. Therefore, in order to support the two modes having different bandwidths in a single frequency band, in case of the UE of the wideband system, it can be assumed that the frequency band allocated to the narrowband system is recognized in advance in addition to the frequency band of the wideband system.

In such a situation, a legacy UE may be supported in a frequency band of the narrowband system. In addition, a UE of the wideband system may operate in a frequency band of the wideband system according to a resource allocation scheme of a frame defined in the narrowband system, or may use additional functions (e.g., determining of a new resource unit, subchannel configuration using the new resource unit, a method of using a new permutation zone, etc.) while not having an effect on a narrowband frame. However, the aforementioned wideband frame structure can be used for the frequency band of the wideband system other than the frequency band of the narrowband system. For this, a control channel may be optionally allocated to a frequency band supporting the wideband mode so that corresponding resources can be effectively used.

In the design of the narrowband system, a guard band is allocated in the frequency band of the narrowband system according to a permutation rule so that an interference signal outside the frequency band has a minimum effect on a data transfer band on which actual data is transmitted. The wideband frame can guarantee orthogonality on subcarriers in the frequency band of the narrowband system, and thus can use all or some of guard bands allocated to the narrowband system. For example, in the wideband frame, some of legacy guard bands of the narrowband system may be allocated to a data transfer band of the wideband system so that a newly allocated guard band can be used as a guard band between a base carrier of the narrowband system and a base carrier of the wideband system. If the base carrier of the narrowband system is allocated to a resource for transmitting data of the wideband system, all of the legacy guard bands of the narrowband system can be allocated to the data transfer band of the wideband system. Accordingly, for the whole frequency band of the wideband system, the wideband system can use all remaining regions in which the data transfer band is excluded in the frequency band of the narrowband system. Optionally, guard subcarriers may be allocated to some of the guard bands of the narrowband system to prevent performance deterioration in the narrowband system, and remaining frequency bands other than the guard bands may be used as resources of the wideband system. As such, when frequency bands of the wideband system are segmented due to the narrowband system, data of the wideband system can be allocated by regarding the segmented frequency bands as consecutive frequency bands. As a result, spectral efficiency can be improved. A preamble can be transmitted in a superframe unit including a plurality of frames or can be transmitted in a frame unit. Alternatively, the preamble can be transmitted through frames spaced apart from one another by a specific interval. Herein, the preamble denotes one or more symbols for downlink synchronization acquisition.

Figure 10:
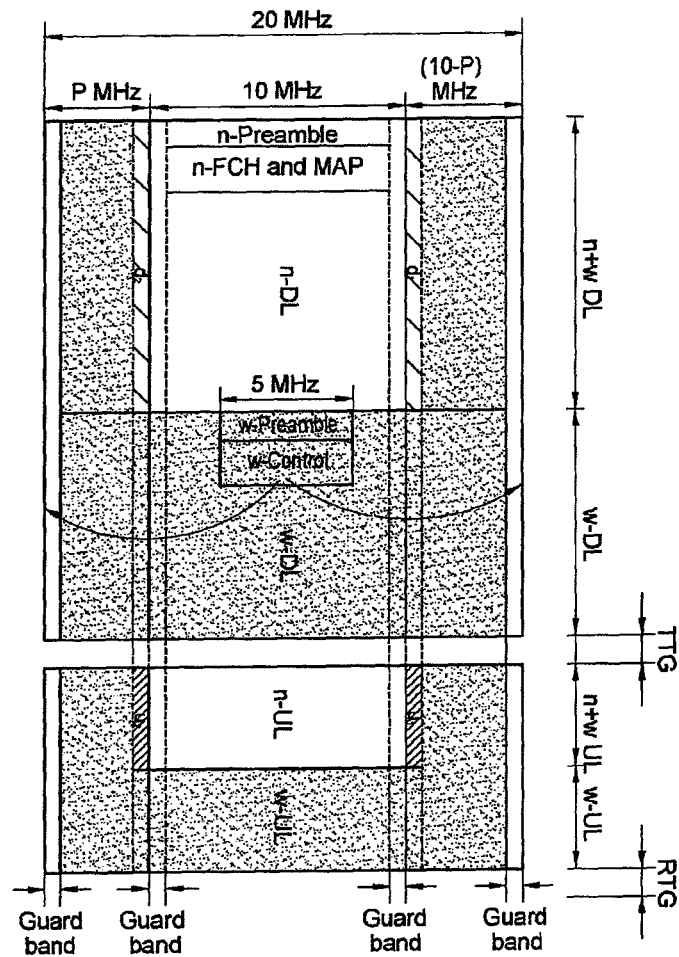
FIG. 10 shows a wideband frame of a wideband system supporting a narrowband system according to another embodiment of the present invention.

FIG. 10 shows a wideband frame of a wideband system supporting a narrowband system according to another embodiment of the present invention.

Referring to FIG. 10, it is assumed that the narrowband system uses a bandwidth of 10 mega hertz (MHz) and the wideband system uses a bandwidth of 20 MHz. The narrowband system and the wideband system can be different systems that share the same frequency band. The wideband system may be a system supporting backward compatibility with the narrowband system. The narrowband system may be an IEEE 802.16e system. The wideband system may be an IEEE 802.16m system. The IEEE 802.16m system supports backward compatibility with the IEEE 802.16e system. In this case, the wideband frame may be a frame of the IEEE 802.16m system supporting the IEEE 802.16e system.

The wideband frame includes a downlink region and an uplink region. The wideband frame can be configured using a TDD scheme in which the downlink region and the uplink region are transmitted through the same frequency band at different time periods. Although it has been described herein that the wideband frame is configured using the TDD scheme, the wideband frame can also be configured using an FDD scheme in which the downlink region and the uplink region are transmitted through different frequency bands at the same time point.

In case of the TDD, the wideband frame is configured so that a narrowband region and a wideband region co-exist while maintaining one or more TTGs/RTGs. The downlink region includes a narrowband downlink (n-DL) region of the narrowband system and a wideband downlink (w-DL) region of the wideband system. The uplink region includes a narrowband uplink (n-UL) region of the narrowband system and a wideband uplink (w-UL) region of the wideband system. The n-DL region carries downlink data of the narrowband system. The n-UL region carries uplink data of the narrowband system. The w-DL region carries downlink data of the wideband system. The w-UL region carries uplink data of the wideband system.

In the downlink region, the wideband frame can be divided into a n+w DL region, in which the n-DL region and the w-DL region co-exist, and a w-DL region in which only the w-DL region exists. In the uplink region, the wideband frame can be divided into a n+w UL region, in which the n-UL region and the w-UL region co-exist, and a w-UL region in which only the w-UL region exists.

A frequency band of the narrowband region is included in a frequency band of the wideband region. The frequency band of the wideband region is a set of a plurality of base carriers. Any one of the plurality of base carriers corresponds to a bandwidth of the narrowband region. A center frequency of the narrowband region may coincide with a center frequency of any one of the plurality of base carriers. Herein, the base carriers correspond to P MHz, 10 MHz, and (10-P) MHz.

Guard bands can be allocated to the respective base carriers. To avoid interference with an adjacent bandwidth used by another system (i.e., wideband system), a guard band allocated to an edge portion of the narrowband region is not used for data transmission. A guard band allocated to an edge portion of a base carrier used by the wideband system can be used as a traffic channel for transmitting data of the wideband system. Guard bands d1, d2, u1, and u2, which are allocated to base carriers of the wideband system are adjacent to the base carriers of the narrowband system, can be used as the traffic channel. A guard band between the base carriers of the wideband system is not necessary, and even if it is allocated, the guard band cannot be used as the traffic channel. All or some of guard subcarriers can be allocated to the traffic channel when a center frequency spacing between adjacent base carriers is an multiple integer of a subcarrier spacing. This is because, by doing so, a wideband subcarrier signal can be prevented from acting as an interference signal with respect to a narrowband subcarrier. This is also because, in a case where all or some of the guard bands are used as the traffic channel, it is possible to maintain orthogonality between subcarriers by setting the center frequency spacing between base carriers to an integer multiple of the subcarrier spacing.

Figure 11:
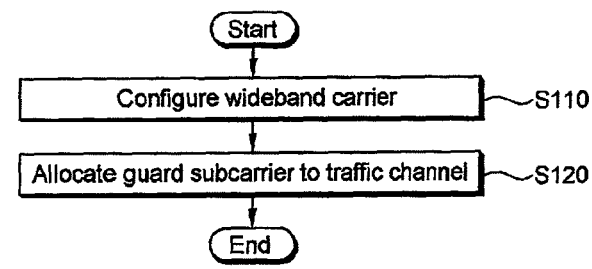
FIG. 11 is a flow diagram showing a method of transmitting a wideband frame of a wideband system supporting backward compatibility with a narrowband system according to an embodiment of the present invention.

FIG. 11 is a flow diagram showing a method of transmitting a wideband frame of a wideband system supporting backward compatibility with a narrowband system according to an embodiment of the present invention.

Referring to FIG. 11, a BS configures a wideband carrier (step S110). The wideband carrier denotes a frequency band of the wideband system. The wideband carrier is a set of base carriers. The wideband carrier may include a plurality of base carriers. A bandwidth of at least one base carrier corresponds to a bandwidth of the narrowband system. Any one of the base carriers coincides with a center frequency of the narrowband system. One of the base carriers may be selected as a band of the narrowband system. A center frequency of the selected base carrier may coincide with the center frequency of the narrowband system. At least one guard subcarrier between the selected base carrier and adjacent base carriers may be reserved as a guard band.

The BS allocates all or some of guard subcarriers between the adjacent base carriers to a traffic channel (step S120). In this case, a center frequency spacing between the adjacent base carriers can be an integer multiple of a subcarrier spacing. Some of the guard subcarriers included in a guard band between a base carrier for the narrowband system and a base carrier for the wideband system can be allocated to the traffic channel. A guard band between base carrier of the wideband system may be unallocated or may be allocated to a data transfer region.

Since a guard band between base carriers can be used as a traffic channel in a wideband frame of the wideband system supporting the narrowband system, resource waste caused by the guard band can be reduced.

The narrowband system of the present invention has a transmission structure of the wideband system supporting co-existence of the legacy narrowband system and the wideband system in consideration of backward compatibility. In addition, the narrowband system of the present invention can use a guard band to transmit a signal in which a narrowband and a wideband co-exist in a system configured to support a narrowband and a wideband, wherein the system is a communication system configured to support various bandwidths for scalable bandwidth support.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a wideband frame in a wideband system having backward compatibility with a narrowband system, the method comprising:
    configuring, by a base station, a wideband carrier from a set of base carriers,
    wherein a bandwidth of any one of the base carriers corresponds to a bandwidth of a narrowband carrier for the narrowband system, and
    wherein a center frequency of the any one of the base carriers is equal to a center frequency of the narrowband carrier;
    allocating, by the base station, a traffic channel to the wideband carrier; and
    transmitting, by the base station, information on the wideband carrier,
    wherein the wideband carrier carries first data for a first user equipment (UE),
    wherein the narrowband carrier carries second data for a second UE, the second UE being different from the first UE,
    wherein each of the base carriers comprises guard subcarriers and traffic subcarriers, and
    wherein, when the wideband carrier is simultaneously transmitted with the narrowband carrier in a specific time duration, first guard subcarriers, located in the wideband carrier and adjacent to the narrowband carrier, are allocated for a traffic channel for the first UE in the specific time duration, and second guard subcarriers, located in the narrowband carrier, are not allocated for a traffic channel for the second UE in the specific time duration.

2. The method of claim 1,
    wherein the wideband carrier comprises a first base carrier, a second base carrier and a third base carrier contiguous in the frequency domain, and
    wherein the narrowband carrier is identical to the second base carrier.

3. The method of claim 1, wherein a bandwidth of each of the base carriers is equal to a bandwidth of the narrowband carrier.

4. The method of claim 1, wherein a center frequency spacing between two adjacent base carriers of the wideband carrier is an integer multiple of a subcarrier spacing.

5. The method of claim 1, wherein, when only one base carrier of the base carriers is used, at least one of the first guard subcarriers and the second guard subcarriers are not used.

6. A base station configured to transmit a wideband frame in a wideband system having backward compatibility with a narrowband system, the base station comprising:
    a processor configured to
        configure a wideband carrier from a set of base carriers,
        wherein a bandwidth of any one of the base carriers corresponds to a bandwidth of a narrowband carrier for the narrowband system, and
        wherein a center frequency of the any one of the base carriers is equal to a center frequency of the narrowband carrier,
        allocate a traffic channel to the wideband carrier, and
        transmit information on the wideband carrier,
        wherein the wideband carrier carries first data for a first user equipment (UE),
        wherein the narrowband carrier carries second data for a second UE, the second UE being different from the first UE,
        wherein each of the base carriers comprises guard subcarriers and traffic subcarriers, and
        wherein, when the wideband carrier is simultaneously transmitted with the narrowband carrier in a specific time duration, first guard subcarriers, located in the wideband carrier and adjacent to the narrowband carrier, are allocated for a traffic channel for the first UE in the specific time duration, and second guard subcarriers, located in the narrowband carrier, are not allocated for a traffic channel for the second UE in the specific time duration.

* * * * *